(12) United States Patent
Wakayama et al.

(10) Patent No.: US 8,827,229 B2
(45) Date of Patent: Sep. 9, 2014

(54) SEAT SLIDE LOCKING APPARATUS

(75) Inventors: Hiroyuki Wakayama, Fuchu-cho (JP); Yasuhito Domoto, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 47 days.

(21) Appl. No.: 13/478,177

(22) Filed: May 23, 2012

(65) Prior Publication Data

US 2012/0298828 A1    Nov. 29, 2012

(30) Foreign Application Priority Data

May 27, 2011   (JP) ................................ 2011-118946

(51) Int. Cl.
*F16M 13/00*   (2006.01)
*B60N 2/08*    (2006.01)

(52) U.S. Cl.
CPC ............ *B60N 2/0818* (2013.01); *B60N 2/0862* (2013.01); *B60N 2/0893* (2013.01); *B60N 2/0875* (2013.01)
USPC ........................................ 248/429; 297/344.1

(58) Field of Classification Search
USPC ......... 248/157, 421, 422, 423, 424, 425, 429, 248/430; 297/344.1, 344.11, 344.12, 297/344.13, 344.14, 344.15
See application file for complete search history.

(56) References Cited

U.S. PATENT DOCUMENTS

| | | | |
|---|---|---|---|
| 5,560,262 A | 10/1996 | Orzech | |
| 5,564,315 A | 10/1996 | Schueler et al. | |
| 5,596,910 A | 1/1997 | Bauer et al. | |
| 5,913,947 A * | 6/1999 | Groche | 74/527 |
| 6,631,952 B1 * | 10/2003 | Liebetrau et al. | 297/341 |
| 7,980,525 B2 * | 7/2011 | Kostin | 248/429 |
| 8,376,460 B2 * | 2/2013 | Nadgouda et al. | 297/344.11 |
| 8,382,057 B2 * | 2/2013 | Napau et al. | 248/423 |
| 2003/0164434 A1 * | 9/2003 | Frohnhaus et al. | 248/430 |
| 2004/0026975 A1 * | 2/2004 | Rausch et al. | 297/344.1 |
| 2006/0261237 A1 | 11/2006 | Noffz | |
| 2009/0114793 A1 * | 5/2009 | Brewer et al. | 248/429 |
| 2009/0322136 A1 * | 12/2009 | Kazyak et al. | 297/344.1 |
| 2010/0102192 A1 | 4/2010 | Tarusawa et al. | |
| 2011/0315847 A1 * | 12/2011 | Simms et al. | 248/429 |

FOREIGN PATENT DOCUMENTS

JP    2010-100169    5/2010

* cited by examiner

*Primary Examiner* — Steven Marsh
(74) *Attorney, Agent, or Firm* — Gerald E. Hespos; Michael J. Porco; Matthew T. Hespos

(57) ABSTRACT

A seat slide locking apparatus comprises a lower rail provided with a plurality of locking holes, and a plurality of locking pieces provided on the lower rail. The locking pieces include a first locking piece 4a having a broad width inserting section 46 and a second locking piece 4b having a narrow width inserting section 47, and are held by a holding member which has a holding hole 66. The holding hole 66 includes a broad width section 66a into which the broad width inserting section 46 is inserted and a narrow width section 66b into which the narrow width inserting section 47 is inserted.

16 Claims, 17 Drawing Sheets

SEAT SLIDE LOCKING APPARATUS

TECHNICAL FIELD

The present invention relates to a seat slide locking apparatus.

BACKGROUND ART

Conventionally, a seat slide locking apparatus is known which comprises a plurality of open engaging sections that are provided in a lengthwise direction of one of an elongate-shaped lower rail fixed to a vehicle body and an elongate-shaped upper rail fixed to a seat, and a locking piece which is held on the other of the lower rail and the upper rail in such a manner that it passes into a holding hole and can enter into and exit from the open engaging sections. One example of this seat slide locking apparatus is that disclosed in Japanese Patent Application Publication No. 2010-100169, for instance.

In the seat slide locking apparatus disclosed in Japanese Patent Application Publication No. 2010-100169, five locking pieces 111 formed to the same width W5 and thickness t5 are held on an upper rail 100 by holding members 110, as shown in FIG. 18 and FIG. 19. In this state, the five locking pieces 111 are inserted respectively in a vertically movable fashion into a first holding hole 100a provided in the upper rail 100 and a second holding hole 110a provided in the holding member 110. When the upper rail 100 is moved with respect to the lower rail 101, the locking pieces 111 enter into and engage with locking holes 101a that form the open engaging sections provided in the lower rail 101, due to the biasing force of springs, thereby locking the upper rail 100 immovably with respect to the lower rail 101.

Furthermore, in a seat slide locking apparatus of this kind, the first holding hole 100a and the second holding hole 110a described above are, in many cases, formed in a quadrilateral shape of a size into which the five locking pieces 111 can enter simultaneously as shown in FIG. 19 (in FIG. 19, the second holding hole 110a is shown).

SUMMARY OF THE INVENTION

Problems to be Solved by the Invention

However, the total thickness t6 of the five locking pieces 111 together may vary due to an accumulation of manufacturing tolerance regarding the thickness t5 of each of the locking pieces 111. Consequently, there is a risk of large error occurring between the length L5 of the second holding hole 110a and the total thickness t6 described above, and for example, there is a risk that the total thickness t6 described above may be small compared to the length L5 of the second holding hole 110a, and a corresponding gap 120 may arise between the locking pieces and the second holding hole. If the gap 120 is large in this way, then there is a problem in that play arises between the locking pieces 111 and the upper rail 100 when the locking pieces 111 have been inserted into the locking holes 101a.

It is an object of the present invention to provide a seat slide locking apparatus which is capable of suppressing play between an upper rail and a lower rail when in a locked state, regardless of manufacturing tolerance in a plurality of locking pieces.

Means for Solving the Problems

The present invention is a seat slide locking apparatus, comprising:

an elongate-shaped lower rail (1) which is fixed to a vehicle body;

an elongate-shaped upper rail (2) which is fixed to a seat;

a plurality of open engaging sections (14, 15) provided in a lengthwise direction of one of the lower rail (1) and the upper rail (2);

a holding member which is formed with a holding hole (66) and is installed on the other one of the lower rail (1) and the upper rail (2); and a plurality of locking pieces (4) which are inserted into the holding hole (66) of the holding member and can enter into and exit from the open engaging sections (14, 15), wherein the plurality of locking pieces include:

a first locking piece (4a) having a broad width inserting section (46); and a second locking piece (4b) having a narrow width inserting section (47) with a width narrower than the broad width inserting section (46), the first locking piece (4a) and the second locking piece (4b) are arranged in one row in such a manner that the respective thickness directions thereof are aligned with the lengthwise direction of the other one of the lower rail (1) and the upper rail (2), and the holding hole (66) includes a broad width section (66a) into which the broad width inserting section (46) is inserted, and a narrow width section (66b) which has a width narrower than the broad width section (66a) and into which the narrow width inserting section (47) is inserted.

According to this composition, a gap which occurs due to error between the length of the broad width section of the holding hole and the thickness of the broad width inserting section of the first locking piece is approximately dependent on the manufacturing tolerance of the broad width section and the thickness of the broad width inserting section of one or a plurality of first locking pieces, and therefore it is possible to keep this gap to a minimum. Consequently, if a force is applied to the seat in a locked state, this force can be received by the broad width inserting section of the first locking piece abutting against the inner circumferential wall and the seating of the broad width section of the holding hole, and play between the upper rail and the lower rail can be suppressed.

These and other objects, features and advantages of the present invention will become apparent upon reading of the following detailed description along with the accompanied drawings.

DETAILED DESCRIPTION OF INVENTION

Figure 1:
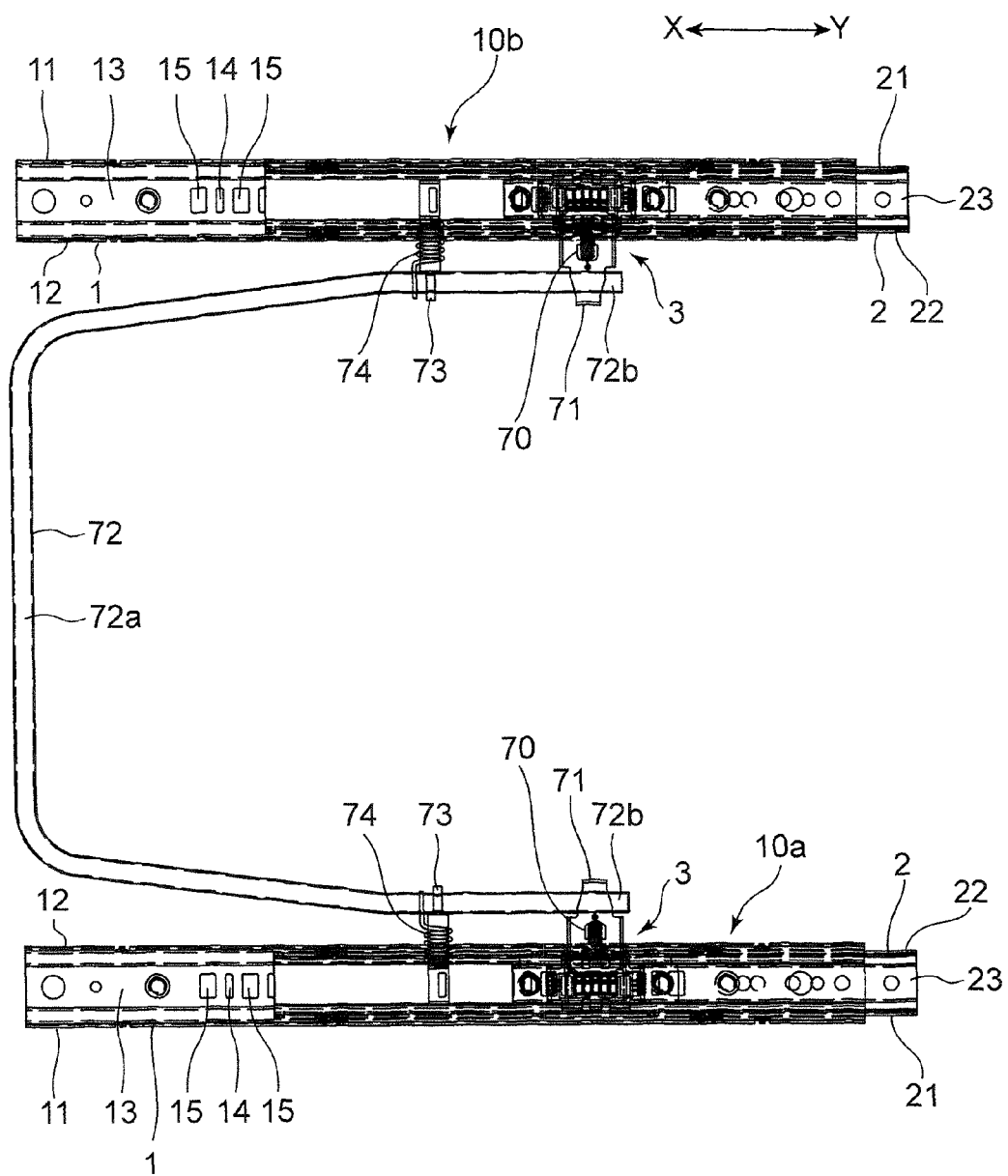
FIG. 1 is a plan diagram of one embodiment of a seat slide locking apparatus according to the present invention.
Figure 2:
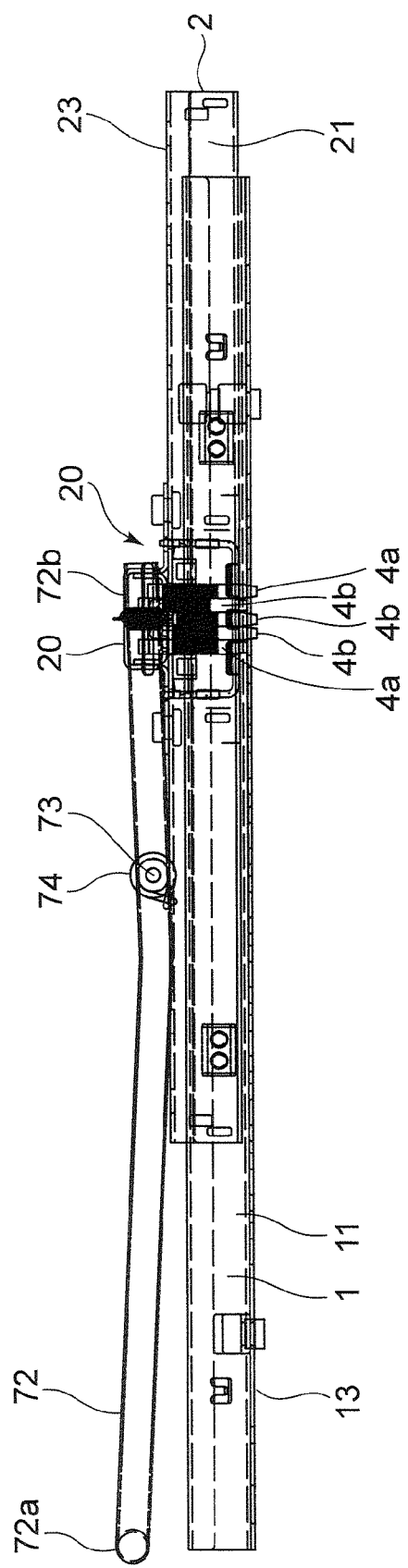
FIG. 2 is a side view diagram of the seat slide locking apparatus in FIG. 1.
Figure 3:
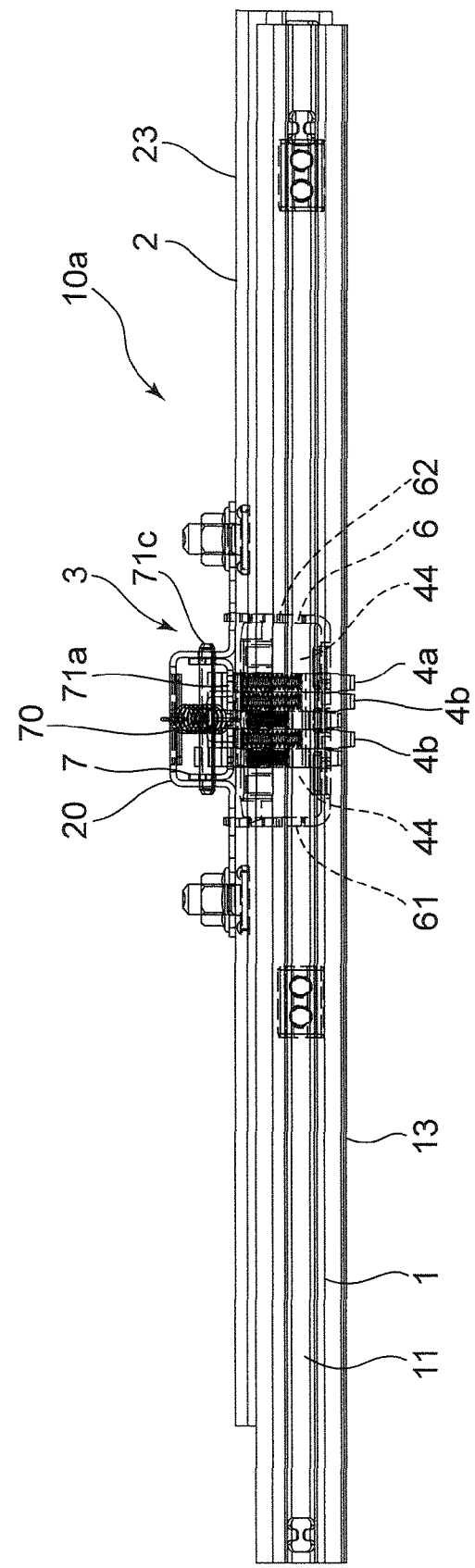
FIG. 3 is a side view diagram of a left-side sliding section omitting the operating member of the seat slide locking apparatus.
Figure 4:
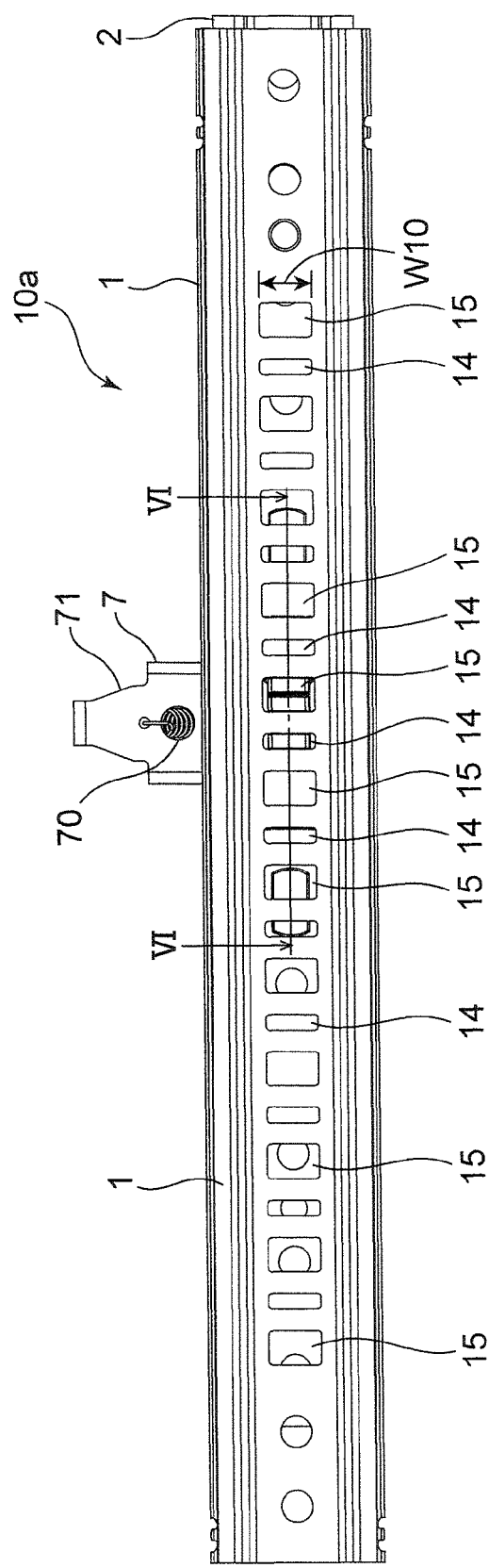
FIG. 4 is a bottom surface diagram of FIG. 3.
Figure 5:
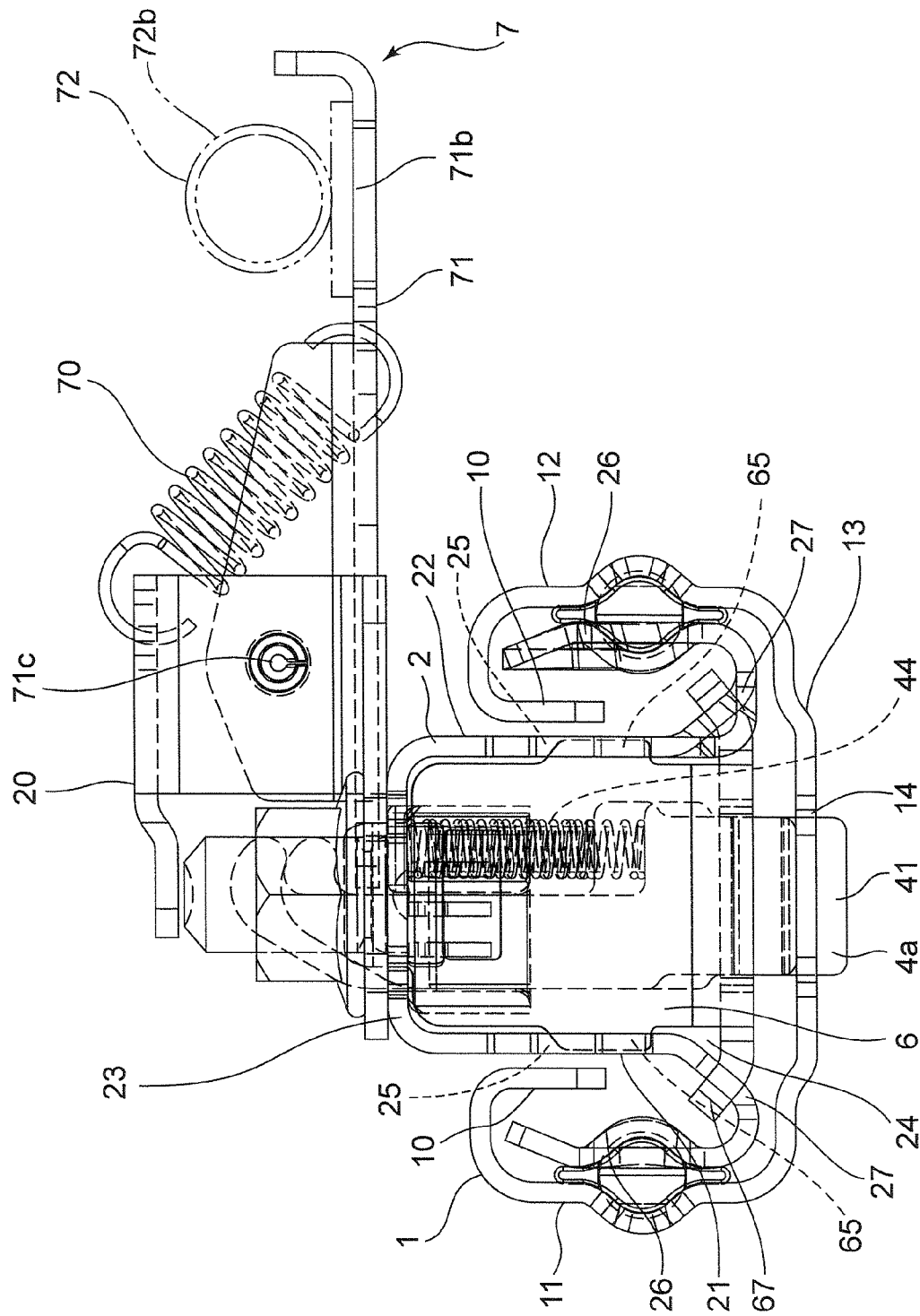
FIG. 5 is an enlarged rear surface diagram of FIG. 3.

Below, a preferred embodiment of the present invention is described in detail with reference to the drawings. FIG. 1 is a plan diagram of one embodiment of a seat slide locking apparatus according to the present invention, FIG. 2 is a side view diagram of the seat slide locking apparatus in FIG. 1, FIG. 3 is a side view diagram of a left sliding section, excluding the operating member of the seat slide locking apparatus, FIG. 4 is a bottom surface diagram of FIG. 3 and FIG. 5 is a rear surface diagram showing an enlarged view of FIG. 3. The X direction in FIG. 1 is taken to be a front side and the Y direction in FIG. 1 is taken to be a rear side.

The seat slide locking apparatus according to the present invention suitably locks and unlocks (releases locking of) sliding of an upper rail 2 with respect to a lower rail 1, and in the present embodiment, the slide locking apparatus is taken to be used in a vehicle such as an automobile. As shown in FIG. 1 to FIG. 5, the seat slide locking apparatus comprises a left-side sliding section 10*a* which is disposed on a lower left side of a vehicle seat, for instance, a driver's seat, and a right-side sliding section 10*b* which is disposed on a lower right side of the driver's seat.

The left-side sliding section 10*a* and the right-side sliding section 10*b* are disposed so as to have left/right symmetry. Below, the left-side sliding section 10*a* is described and the description of the right-side sliding section 10*b* is omitted.

As shown in FIG. 3 to FIG. 5, the left-side sliding section 10*a* includes a lower rail 1, an upper rail 2, a locking member 3 and a locking release operating member 7.

The lower rail 1 is constituted by an elongate-shaped member, which is fixed to the floor of an automobile with the lengthwise direction aligned to the front/rear direction of the automobile. The lower rail 1 comprises a left-side wall 11 which is a first wall and a right-side wall 12 which is a second wall, these walls being arranged in mutually opposing fashion at a distance apart in the left/right direction as shown in FIG. 5, and a bottom wall 13 which is a third wall, that connects the lower end sides (base end sides) of these two side walls.

In this embodiment, the left-side wall 11 and the right-side wall 12 are formed by bending the left edge and the right edge of the bottom wall 13 respectively upwards. Furthermore, the left side wall 11 and the right side wall 12 are respectively provided with fold back pieces 10 which are folded back to the inner side from the upper ends of the walls.

Moreover, the bottom wall 13 comprises a plurality of locking holes 14, 15 which are quadrilateral-shaped open engaging sections into which the locking pieces 4*a*, 4*b* of a locking member 3 which is described below can be introduced, as shown in FIG. 4. Furthermore, the locking holes according to this embodiment are two types of holes having different front/rear lengths, namely, a plurality of first locking holes 14 and a plurality of second locking holes 15.

In this embodiment, the first locking holes 14 and the second locking holes 15 are constituted by holes which pass from the upper surface to the lower surface of the bottom wall 13.

The front/rear length and left/right width of the first locking holes 14 are formed to be substantially the same as the front/rear length and left/right width of locking hook sections 41 of the first locking pieces 4*a*, which are described below, in such a manner that the locking hook sections 41 can enter into and exit from the first locking holes 14.

The left/right width W10 of the second locking holes 15 is substantially the same as that of the first locking holes 14, but the front/rear width thereof is formed to substantially two times the front/rear length of the first locking holes 14, in other words, substantially two times the front/rear length of the locking hook sections 41 of the locking pieces 4*a*, 4*b* described below, in such a manner that the locking hook sections 41 of a first locking piece 4*a* and a second locking piece 4*b*, or of two second locking pieces 4*b*, can enter into and exit from each second locking hole 15 simultaneously.

The first locking hole 14 and the second locking hole 15 are arranged alternately along the lengthwise direction of the bottom wall 13. Furthermore, the distance between a first locking hole 14 and a second locking hole 15 which are mutually adjacent is set to be substantially the same as the front/rear length of the first locking hole 14.

The upper rail 2 is constituted by an elongate-shaped member which is of substantially the same length as the lower rail 1, is installed in fixed fashion to an automobile seat (not illustrated) and is arranged slidably along the lengthwise direction of the lower rail 1. Due to the upper rail 2 sliding along the lower rail 1, the automobile seat is able to move in the front/rear direction.

The upper rail 2 comprises a left-side wall 21 which is a first wall and a right-side wall 22 which is a second wall, these walls being arranged in mutually opposing fashion at a distance apart in the left/right direction as shown in FIG. 5, and a top wall 23 which connects the upper end sides (base end sides) of the side walls.

Furthermore, in this embodiment, the left-side wall 21 and the right-side wall 22 are formed by bending respectively downwards from the left and right-hand ends of the top wall 23, in addition to which fold back pieces 26 which are bent upwards to the outer side from the lower front end of each side wall are also provided.

Figure 6:
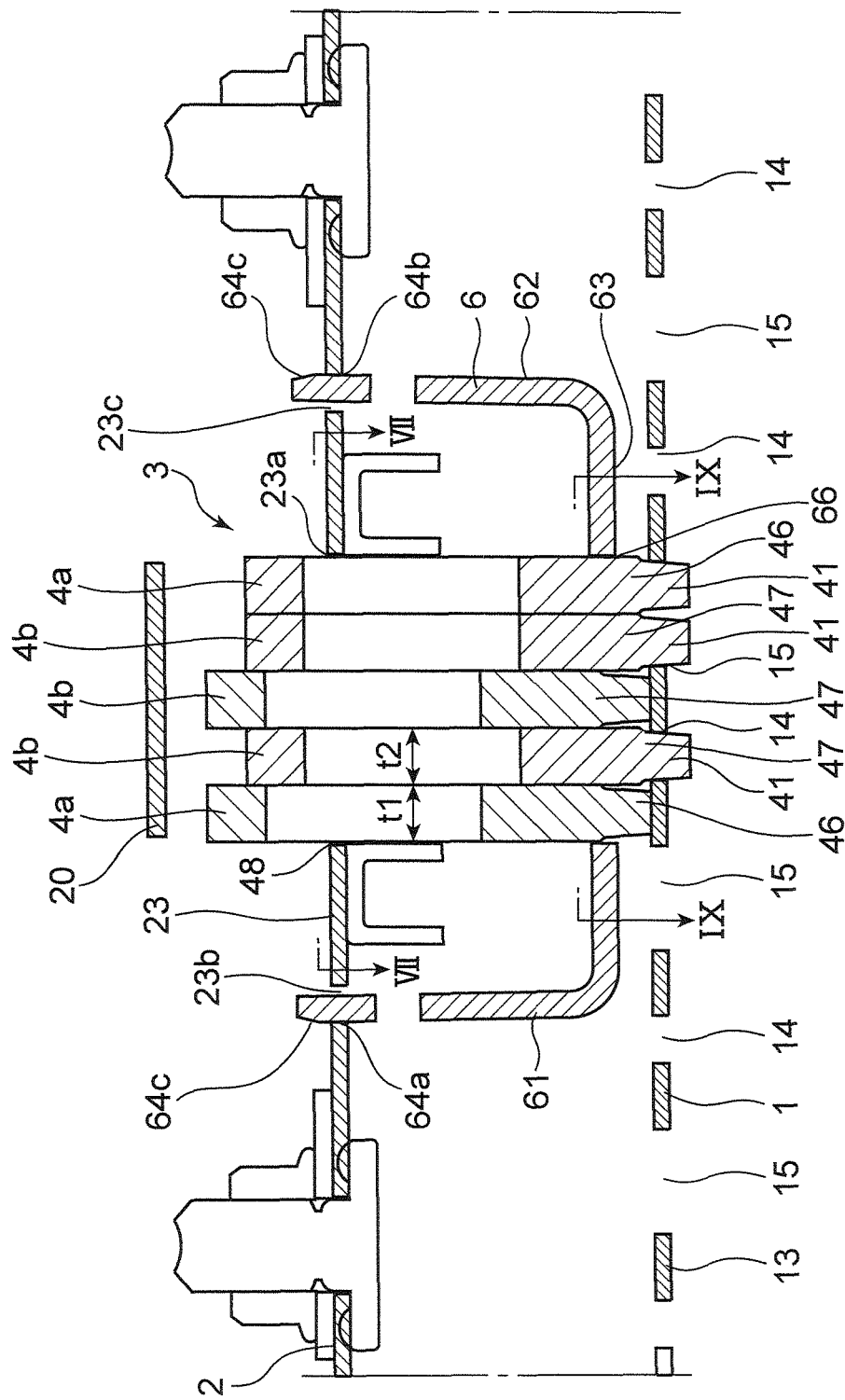
FIG. 6 is a cross-sectional diagram along VI-VI in FIG. 4.

As shown in FIG. 6, the left-side wall 21 and the right-side wall 22 are respectively provided with a front and rear pair of first engaging holes 25 which are formed at a distance apart in the lengthwise direction (front/rear direction). Furthermore, as shown in FIG. 5, the left-side wall 21 and the right-side wall 22 are respectively provided with second engaging holes 27, on the lower sides thereof.

The top wall 23 comprises a first holding hole 23*a*, and a front play preventing hole 23*b* and a rear play preventing hole 23*c*, which are formed respectively on the front and rear sides of the first holding hole 23*a*.

Figure 7:
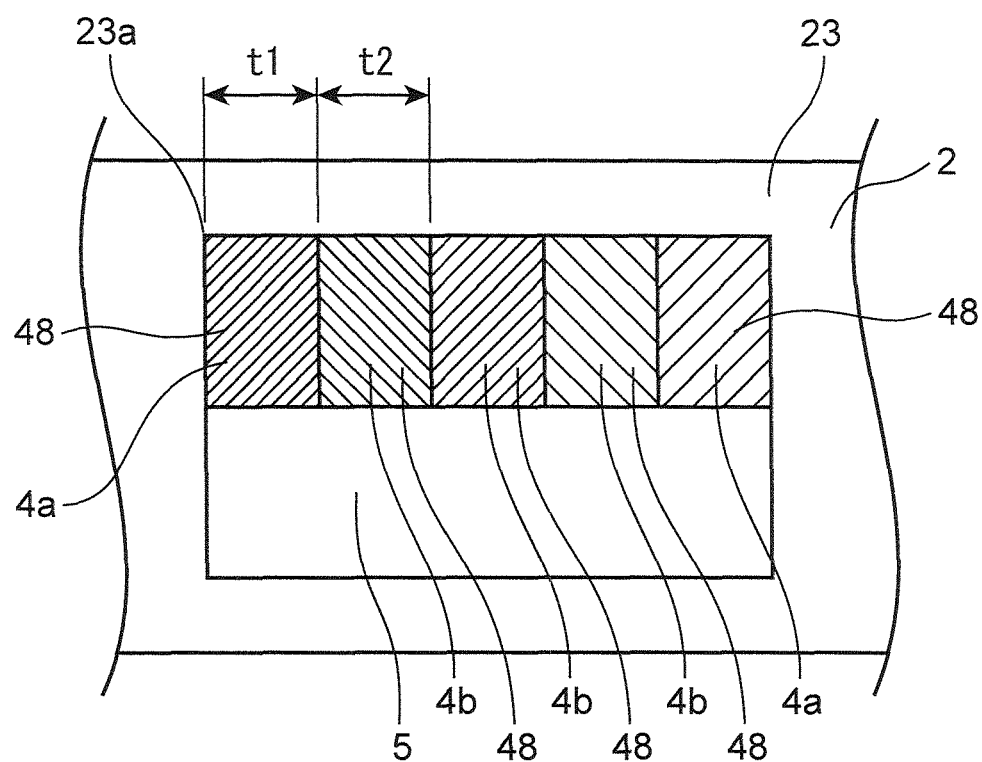
FIG. 7 is a cross-sectional diagram along VII-VII in FIG. 6.
Figure 8:
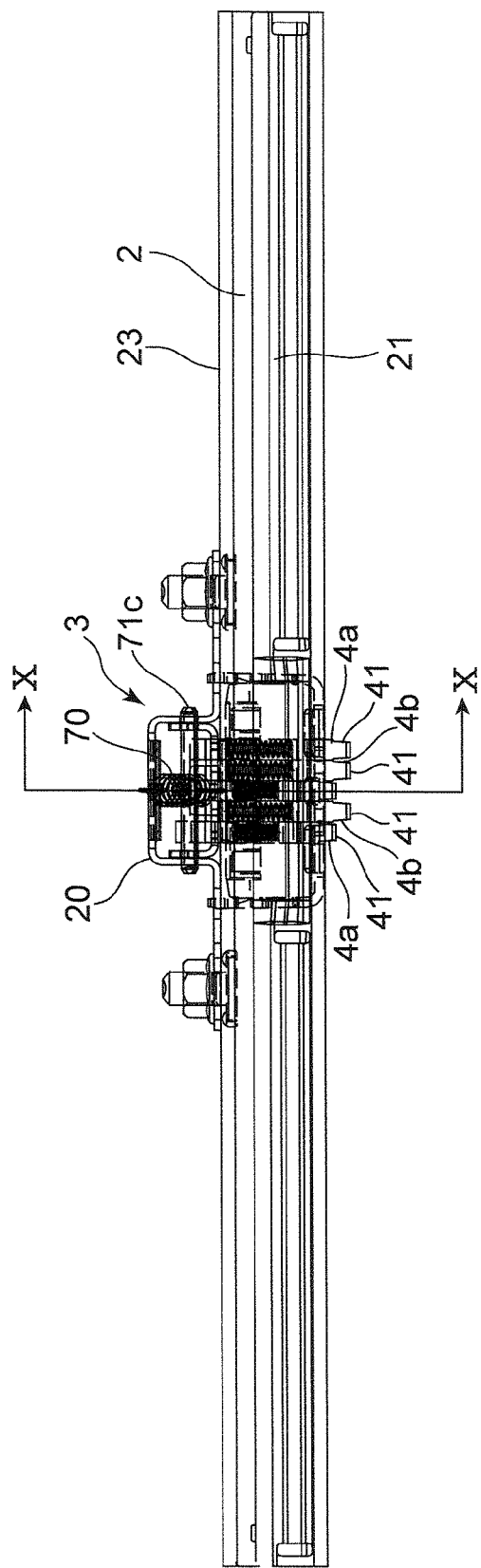
FIG. 8 is a side view diagram of an upper rail on which a locking member is installed.

As shown in FIG. 7, the first holding hole 23*a* is formed with an elongated shape, and first inserting sections 48 of the locking pieces 4*a*, 4*b* which are described below are inserted in vertically movable fashion into the first holding hole 23*a*.

Furthermore, similarly to the lower rail 1 described above, at least one of the left-side wall 21, the right-side wall 22 and the top wall 23, of the upper rail 2 (in the present embodiment, all of these walls) are formed from a material having elasticity.

Moreover, as shown in FIG. 5, an inter-wall opening section 24 is formed in the lower region of the upper rail 2 between the left-side wall 21 and the right-side wall 22. When an external force is applied to as to increase the opening width of the inter-wall opening section 24, the left-side wall 21, the right-side wall 22 and the top wall 23 flex, and the opening width of the inter-wall opening section 24 is pushed and expanded. When this external force is released, the inter-wall opening section 24 returns to its original width due to the elastic properties.

Figure 11:
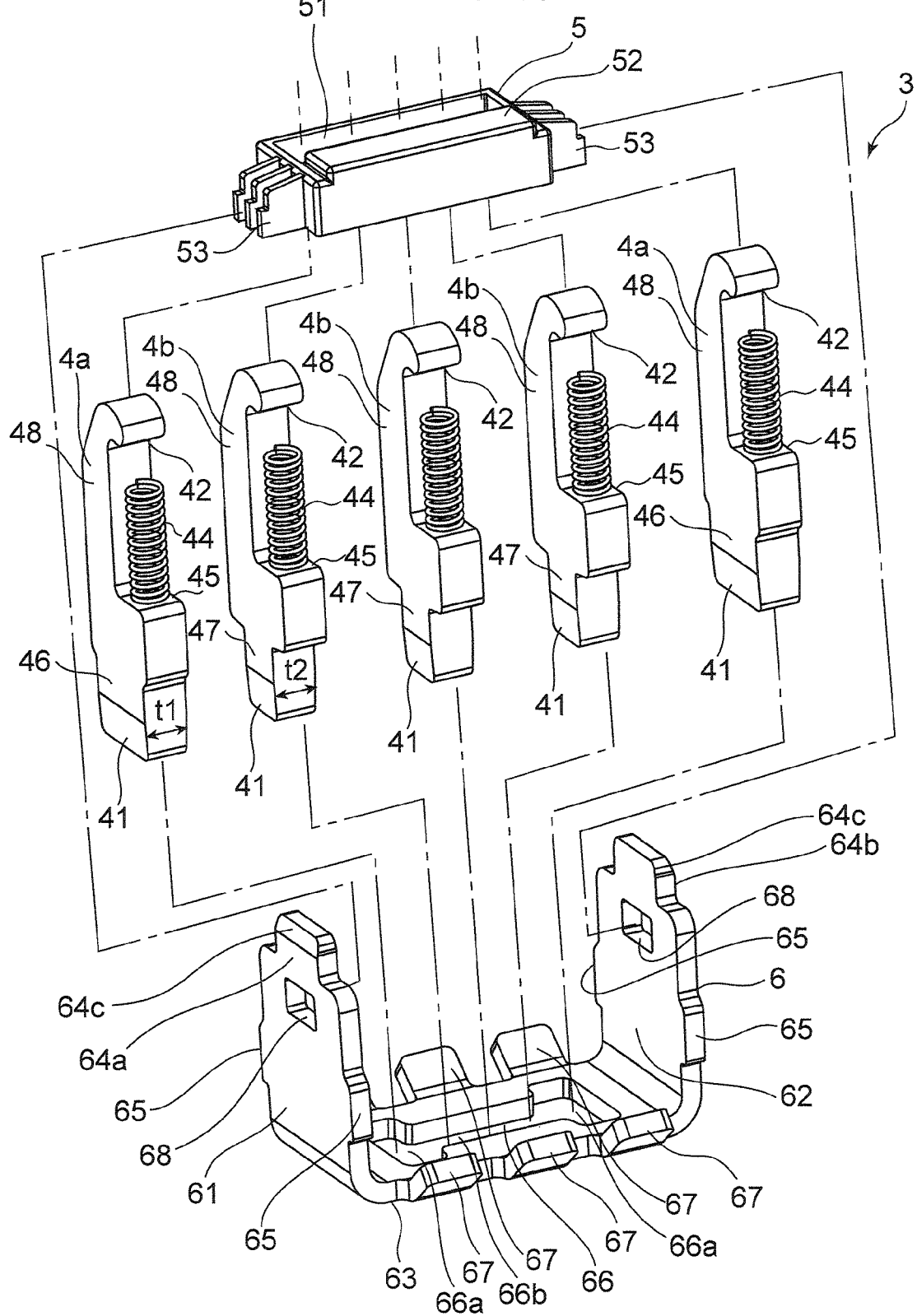
FIG. 11 is an exploded perspective diagram of a locking member.

Next, a locking member 3 will be described. As shown in FIG. 11, the locking member 3 comprises a plurality of locking pieces 4a, 4b, and a holding member which holds the locking pieces 4a, 4b.

In this embodiment, the locking pieces 4a, 4b are constituted by two first locking pieces 4a and three second locking pieces 4b which are arranged between the first locking pieces 4a. The first locking pieces 4a are each formed to have the same thickness t1, and each comprise, on the lower side thereof, a broad width inserting section 46 which is a second inserting section that is inserted in vertically movable fashion into a second holding hole 66 of the holding member, which is described below, and provided on the lower side of the broad width inserting section 46, a locking hook section 41 which enters into and exits from the locking holes 14, 15 of the lower rail 1.

In this embodiment, each locking hook section 41 has a taper section in which the thickness becomes progressively thinner toward the lower side, in such a manner that the locking hook section 41 can readily enter into and exit from the locking holes 14, 15 of the lower rail 1, due to this taper section.

Furthermore, the first locking pieces 4a each comprise, on the upper side thereof, a first inserting section 48 which is inserted in vertically movable fashion into the first holding hole 23a of the upper rail 2 described above, and provided on the upper side of this first inserting section 48, an operating section 42, which is operated by being pulled up by a lock release operating member, which is described below. The first locking pieces 4a are provided, on the lower side thereof, with a broad width inserting section 46 (second inserting section) which is inserted in vertically movable fashion into the second holding hole 66, which is formed in a bracket 6 of the holding member described above.

In the second locking pieces 4b, the second inserting sections which are inserted in a vertical movable fashion into the second holding hole 66 of the holding member are each constituted by a narrow width inserting section 47 which has a narrower width than the broad width inserting sections 46 that constitute the second inserting sections of the first locking pieces 4a. Apart from this, the second locking pieces 4b have the same composition as the first locking pieces 4a.

The two first locking pieces 4a and the three second locking pieces 4b which are composed in this fashion are arranged in one row with their respective thickness directions aligned with the lengthwise direction of the upper rail 2, in such a manner that the second locking pieces 4b are arranged between the first locking pieces 4a and each of the first locking pieces 4a is adjacent to a second locking piece 4b.

The holding member comprises a holding frame 5 which holds the locking pieces 4a and 4b in vertically movable fashion, and a bracket 6 which supports the holding frame 5.

The bracket 6 comprises a front and rear pair of pieces, namely, a first piece 61 and a second piece 62, which are arranged in mutually opposing fashion at a distance apart in the front/rear direction, and a connecting piece 63 which connects the lower end sides (base end sides) of the first and second pieces. In this embodiment, the first piece 61, the second piece 62 and the connecting piece 63 are formed by upwardly bending the front and rear side portions of a single plate-shaped body of a prescribed thickness.

The first piece 61 and the second piece 62 each comprises first rail engaging pieces 65 which respectively project in the leftward direction and the rightward direction, on both the left and right-hand sides in the width direction.

The front/rear length of each of the first rail engaging pieces 65 is set to be approximately the same as the front/rear length of the first engaging holes 25 of the upper rail 2. The distance between the first rail engaging pieces 65 is set to be substantially the same as the distance between the first engaging holes 25 of the upper rail 2, in such a manner that the first rail engaging pieces 65 fit respectively into the first engaging holes 25.

Furthermore, as shown in FIG. 11, the first piece 61 and the second piece 62 respectively comprise, on the front end sides thereof, a first play preventing section 64a and a second play preventing section 64b for preventing play of the holding member with respect to the upper rail 2. When an external force is applied in a direction so as to reduce or increase the front/rear distance between the first and second play preventing sections 64a and 64b, at least one of the first piece 61, the second piece 62 and the connecting piece 63 (in the present embodiment, all of these pieces) flex (against their elastic properties), and the distance is reduced or increased. When this external force is removed, the play preventing sections 64a and 64b are restored by their elastic properties and the distance is returned to the original distance.

In this embodiment, the distance in the front/rear direction between the first play preventing section 64a and the second play preventing section 64b is set so as to be greater than the distance between the front play preventing hole 23b and the rear play preventing hole 23c of the upper rail 2 (the distance between the front inner surface which demarcates the front play preventing hole 23b and the rear inner surface which demarcates the rear play preventing hole 23c, as shown in FIG. 7), in a normal state where no external force is applied.

The first play preventing section 64a and the second play preventing section 64b are also formed in such a manner that when an external force is applied in a direction so as to reduce the front/rear distance therebetween, the first piece 61, the second piece 62 and the connecting piece 63 flex against their elastic properties, thereby shortening the distance, in such a manner that the first play preventing section 64a and the second play preventing section 64b enter respectively into the front play preventing hole 23b and the rear play preventing hole 23c of the upper rail 2.

Moreover, in this embodiment, the first play preventing section 64a and the second play preventing section 64b are respectively provided with guiding sections 64c each consisting of an inclined surface formed in such a manner that the distance therebetween progressively becomes smaller toward the front end side (upper end side) thereof. By means of these guiding sections 64c, the first play preventing section 64a and the second play preventing section 64b enter readily when inserted respectively into the front play preventing hole 23b and the rear play preventing hole 23c of the upper rail 2.

The connecting piece 63 comprises a second holding hole 66 through which the locking pieces 4a, 4b pass downwards, and second rail engaging pieces 67 which project in the width direction respectively on both the left and right-hand end sides in the width direction.

Figure 9:
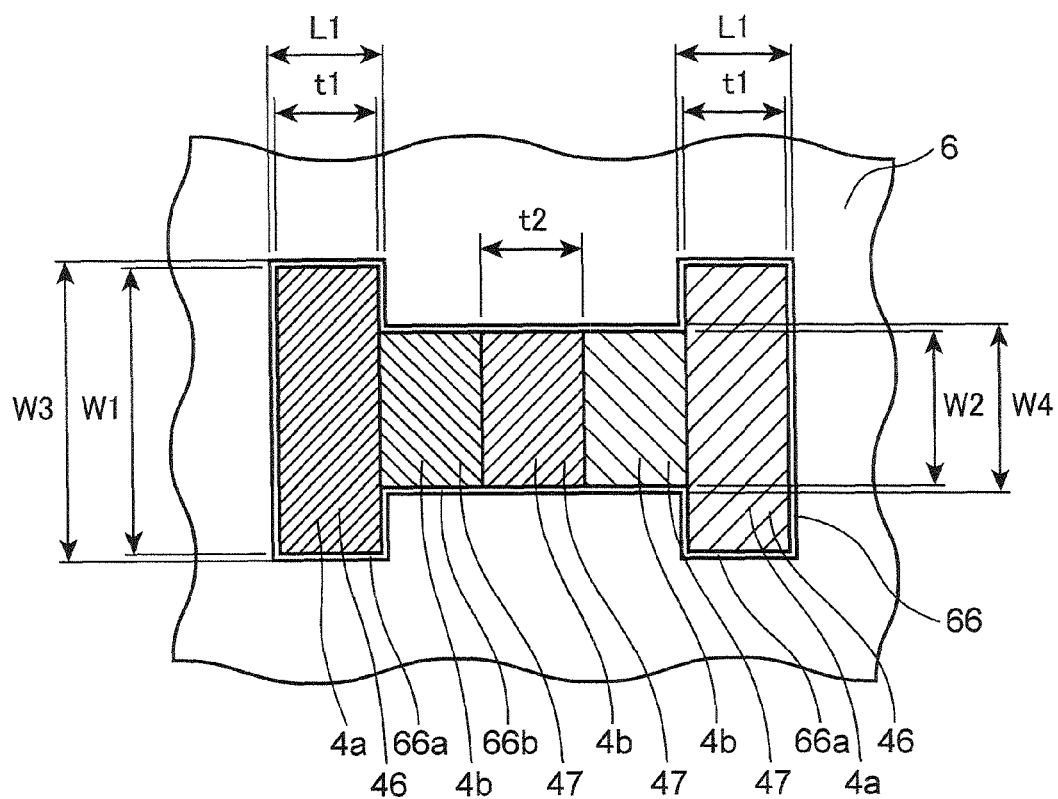
FIG. 9 is a cross-sectional diagram along IX-IX in FIG. 6.

As shown in FIG. 9, the second holding hole 66 which is formed in the bracket 6 of the holding member is constituted by broad width sections 66a that are disposed respectively on either side in the lengthwise direction and a narrow width section 66b which is disposed between the broad width sections 66a. The broad width sections 66a are each a section into which a broad width inserting section 46 of a first locking piece 4a is inserted and are formed to a width W3 which is substantially the same as the width W1 of a broad width inserting section 46. The length L1 of each broad width section 66a in the front/rear direction, which follows the lengthwise direction, is formed to be substantially the same as the thickness t1 of a broad width inserting section 46.

The narrow width section 66b is a section into which the narrow width inserting sections 47 of the second locking pieces 4b are inserted, the width W4 thereof being formed to be substantially the same as the width W2 of the narrow width inserting sections 47 and the length thereof in the front/rear direction being formed to be substantially the same as the total thickness of three narrow width inserting sections 47.

In this embodiment, the second rail engaging pieces 67 are formed to have substantially the same front/rear length as the front/rear length of the second engaging holes 27 in the upper rail 2 (see FIG. 10), at positions corresponding to the second engaging holes 27.

Next, a holding frame 5 of the holding member will be described with reference to FIG. 11. The holding frame 5 comprises a tubular section 51, and the first locking pieces 4a and the second locking pieces 4b are held in a vertically movable fashion in front/rear alignment inside this tubular section 51.

Furthermore, the first locking pieces 4a and the second locking pieces 4b which are held in the tubular section 51 are biased downwards with respect to the holding frame 5 at all times, by coil springs 44 which form biasing members.

More specifically, the coil springs 44 are each provided between a first spring receiving section 45 provided on the locking pieces 4a, 4b and a second spring receiving section 52 provided on the holding frame 5. The lower end of each coil spring 44 abuts against the first spring receiving section 45, the upper end of the coil spring 44 abuts against the second spring receiving section 52, and the first spring receiving section 45 is biased downwards in a direction away from the second spring receiving section 52 by the biasing force of the coil spring 44.

The holding flame 5 is supported by the first piece 61 and the second piece 62 in such a manner that supporting pieces 53 provided respectively on the front and rear ends are inserted into supporting holes 68 which are provided respectively in the first piece 61 and the second piece 62 of the bracket 6.

The locking member 3 which is composed as described above is installed on the lower rail 2 in the following manner.

In a state where the supporting pieces 53 of the holding frame 5 have been respectively inserted into and supported by the supporting holes 68 of the first piece 61 and the second piece 62 of the bracket 6, the first piece 61 and the second piece 62 are pushed in via the inter-wall opening section 24 of the upper rail 2.

By this means, as shown in FIG. 5, the first rail engaging pieces 65 of the first piece 61 and the second piece 62 push open the inter-wall opening section 24 of the upper rail 2, against the elastic properties of the upper rail 2, and the first piece 61 and the second piece 62 enter into the upper side (interior portion) of the upper rail 2 between the left-side wall 21 and the right-side wall 22.

The guiding section 64c of the first play preventing section 64a of the first piece 61 abuts against the front inner wall that demarcates the front play preventing hole 23b of the upper rail 2, and furthermore the guiding section 64c of the second play preventing section 64b of the second piece 62 abuts against the rear inner wall that demarcates the rear play preventing hole 23c of the upper rail 2.

Figure 12:
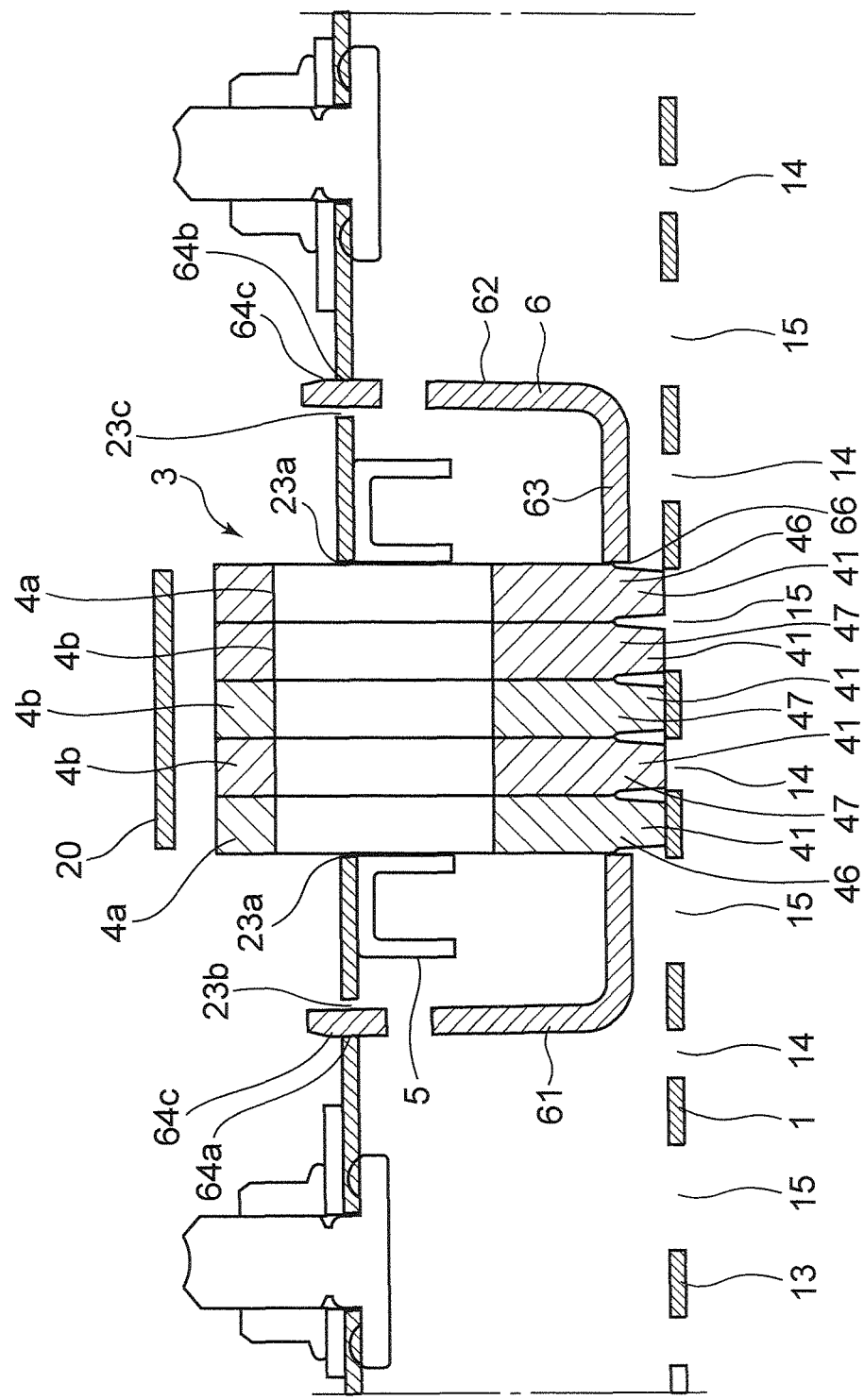
FIG. 12 is an illustrative cross-sectional diagram showing an upper rail and a lower rail in an unlocked state.

Furthermore, when the first piece 61 and the second piece 62 are pushed in further from this state toward the upper side of the upper rail 2, then as shown in FIG. 12, the guiding sections 64c slide up over the front inner wall and the rear inner wall. By this means, the distance between the first play preventing section 64a and the second play preventing section 64b becomes smaller, against the elastic properties, and the first and second play preventing sections 64a and 64b enter respectively into the front play preventing hole 23b and the rear play preventing hole 23c.

In so doing, the first play preventing section 64a and the second play preventing section 64b can readily be introduced respectively into the front play preventing hole 23b and the rear play preventing hole 23c, due to the presence of the guiding sections 64c, and the operation can simplified.

Furthermore, as the first piece 61 and the second piece 62 are pushed in, when the first rail engaging pieces 65 of the first piece 61 and the second piece 62 become aligned with the first engaging holes 25 in the left-side wall 21 and the right-side wall 22 of the upper rail 2, the first rail engaging pieces 65 enter into the first engaging holes 25, as shown in FIG. 6. When the first rail engaging pieces 65 enter into the first engaging holes 25, the inter-wall opening section 24 of the upper rail 2 is restored by elastic properties and hence the opening width returns to the original state.

By this means, when the first piece 61 and the second piece 62 move downwards with respect to the upper rail 2, the first rail engaging pieces 65 engage with the lower inner surfaces that demarcate the first engaging holes 25 and are prevented from leaving the first engaging holes 25.

Figure 10:
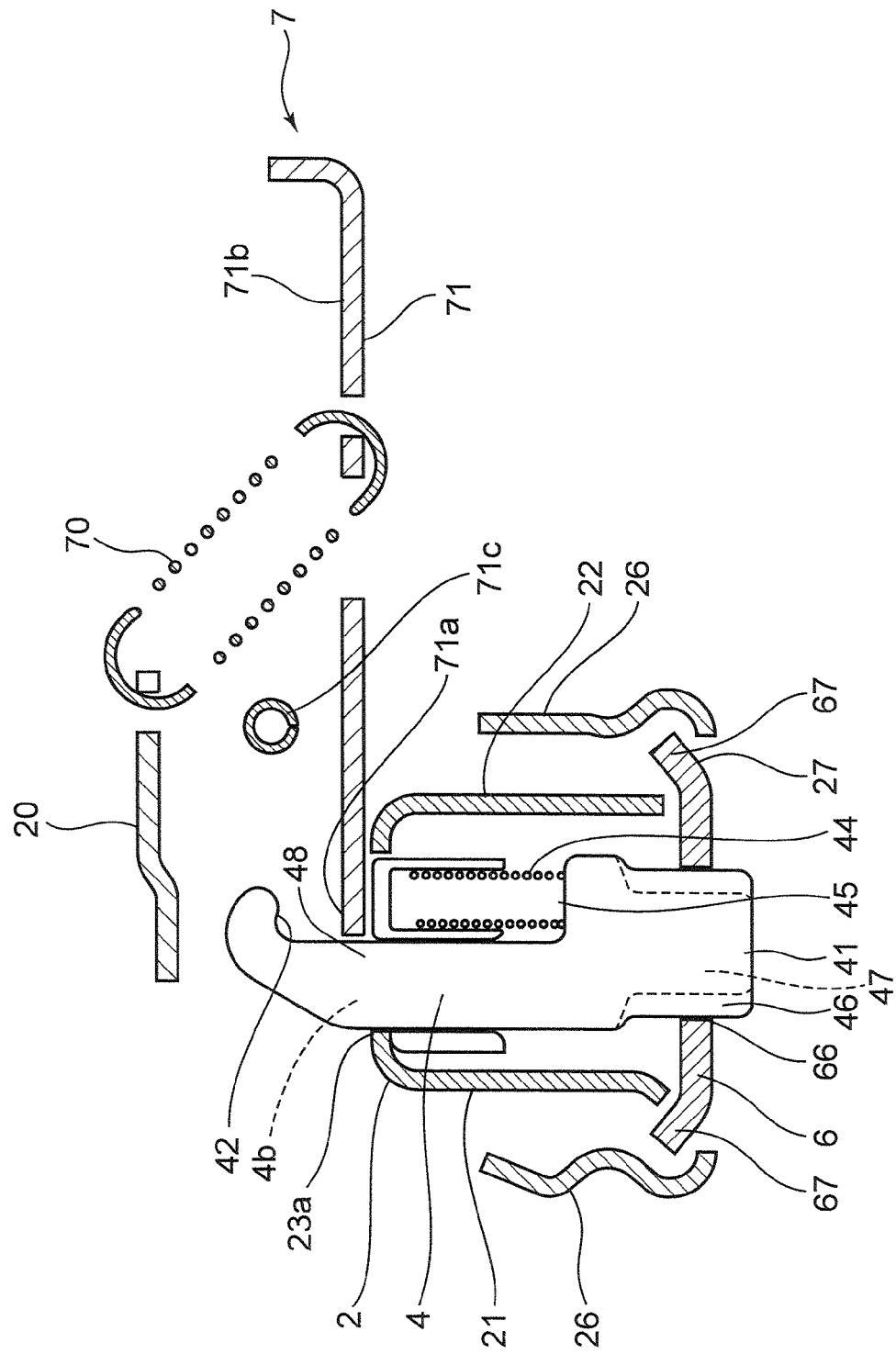
FIG. 10 is a cross-sectional diagram along X-X in FIG. 8.

Furthermore, at substantially the same time that the first rail engaging pieces 65 become aligned with the first engaging holes 25 of the upper rail 2, the second rail engaging pieces 67 become aligned with the second engaging holes 27 of the upper rail 2, and as shown in FIG. 5 and FIG. 10, enter into the second engaging holes 27 when the upper rail 2 is restored to its original state.

In this state, at the same time that the first play preventing section 64a of the first piece 61 pushes the front inner wall demarcating the front play preventing hole 23b of the upper rail 2 forwards by elastic force, the second play preventing section 64b pushes the rear inner wall demarcating the rear play preventing hole 23c forwards by elastic force, thereby making it possible to prevent play between the locking member 3 and the upper rail 2.

Furthermore, if a force in the front/rear direction following the lengthwise direction of the upper rail 2 is applied to the lock member 3, in addition to the first rail engaging pieces 65 abutting against the front or rear inner surfaces which demarcate the first engaging holes 25, the second rail engaging pieces 67 abut against the front or rear inner surfaces which demarcate the second engaging holes 27.

Consequently, it is possible to reduce the risk of the locking member 3 becoming detached from the upper rail 2, and furthermore, deformation of the bracket 6 can be suppressed and the fixed state between the locking member 3 and the upper rail 2 can be maintained.

Next, a locking release operating member 7 will be described. The locking release operating member 7 serves to release locking of the locking pieces 4a, 4b, and as shown in FIG. 1 to FIG. 5, comprises a locking piece pulling up member 71 which pulls up the locking pieces 4a, 4b, a pulling up member biasing spring 70 which biases the locking piece pulling up member 71, and an operating member 72 which can move and operate the locking piece pulling up member 71.

As shown in FIG. 10, the locking piece pulling up member 71 comprises a locking piece engaging section 71a which engages detachably with the operating sections 42 of the locking pieces 4a, 4b, provided on one end side, and a pressing operating section 71b which is pressed and operated by the operating member 72, provided on the other end side.

As shown in FIG. 3, the locking piece engaging section 71a is set to be longer in the front/rear direction than the overall length in the front/rear direction of the five locking pieces 4a, 4b. The locking piece engaging section 71a is disposed in a position below the operating sections 42 of each of the locking pieces 4a, 4b.

Furthermore, as shown in FIG. 3 and FIG. 5, a bearing section 71c which is supported rotatably on an installation member 20 provided on the upper rail 2 is provided between the locking piece engaging section 71a and the pressing operating section 71b in the locking piece pulling up member 71.

By this bearing section 71c, the locking piece pulling up member 71 is formed in such a manner that the locking piece engaging section 71a moves upwards when the pressing operating section 71b is pushed downwards. Moreover, with this upward movement, the locking piece engaging section 71a engages with the operating sections 42 of the respective locking pieces 4a, 4b, and the locking pieces 4a, 4b are each pulled upwards.

One end side of the pulling up member biasing spring 70 is engaged with the installation member 20, and the other end side thereof is installed on a portion of the locking piece pulling up member 71 which is on the side of the right-side pressing operating section 71b with respect to the bearing section 71c. Consequently, the pressing operating section 71b is biased upwards at all times by the biasing force of the pulling up member biasing spring 70.

In this embodiment, as shown in FIG. 1 and FIG. 2, the operating member 72 is constituted by a round bar which is bent in an approximate U shape, a gripping section 72a being provided on the front end thereof, and pressing sections 72b which press the pressing operating sections 71b of the locking piece pulling up members 71 of the left-side sliding section 10a and the right-side sliding section 10b being provided respectively on the left and right rear ends of the operating member 72.

The gripping section 72a is disposed to the lower side of the front end side of the seat, which is not illustrated, and an occupant sitting on the seat is able to grip the gripping section 72a while seated. Furthermore, the pressing sections 72b are disposed to the upper side of the pressing operating sections 71b.

In this embodiment, the operating member 72 is arranged swingably via axles 73. More specifically, the axles 73 are held on the upper rail 2. The operating member 72 is installed in such a manner that the intermediate portions thereof between the gripping section 72a and the pressing sections 72b can rotate about the axles 73.

Consequently, when the gripping section 72a is pulled upwards by the occupant, the pressing sections 72b move downwards and press down the pressing operating sections 71b. Furthermore, the axles 73 in this embodiment are respectively biased by operating member biasing springs 74, and when the occupant has manually pulled up the gripping section 42a and then releases his or her hand, the gripping section 72a is returned to the original state shown in FIG. 2 by the operating section member biasing springs 74.

Next, the operation of the slide locking apparatus for an automobile seat according to the present embodiment will be described. When the occupant of the seat pulls up the gripping section 72a of the operating member 72, the pressing operating sections 71b of the locking piece pulling up members 71 are pressed downwards.

Accordingly, as shown in FIG. 12, the locking piece engaging sections 71a of the locking piece pulling members 71 engage with the operating sections 42 of all of the locking pieces 4a, 4b and are able to pull up all of the locking pieces 4a, 4b against the biasing force of the coil springs 44. In this state, the hook sections 41 of all of the locking pieces 4a, 4b are removed from the locking holes 14, 15.

Furthermore, in this state, each upper rail 2 becomes slidable with respect to the lower rail 1; for example, if the seat is pushed forwards or rearwards by the occupant, the upper rails 2 slide forwards or rearwards with respect to the lower rails 1 and the seat moves forwards or rearwards.

When the occupant has adjusted the front/rear position of the seat to a suitable position on the forward side or the rearward side and then releases his or her hand from the operating member 72 that he or she was gripping, the operating member 72 is returned to its original state by the biasing force of the operating member biasing springs 74, and furthermore the locking pieces 4a, 4b which have been arranged at desired positions are biased downwards by the coil springs 44.

Due to this biasing force, three of the five locking pieces 4a, 4b enter suitably into a first locking hole 14 and a second locking hole 15 and the upper rail 2 and the lower rail 1 become locked and assume a non-slidable state (see FIG. 6). Furthermore, in this case, at least one of the two first locking pieces 4a always enters into a first locking hole 14 or a second locking hole 15.

In this locked state, when a force is applied to slide the upper rails 2 with respect to the lower rails 1, this force is received by the first locking pieces 4a, and the like, which have entered into a first locking hole 14 and a second locking hole 15, and movement of the upper rails 2 is impeded.

In this case, a gap which occurs due to error between the length in the front/rear direction of the broad width section 66a of the second holding hole 66 of the bracket 6 and the thickness of the broad width inserting sections 46 of the first locking pieces 4a is dependent on the approximate manufacturing error of the broad width section 66a and the thickness of the broad width inserting section 46 of one first locking piece 4a. Thus, it is possible to keep this gap to minimum. Consequently, when the force described above is applied to the upper rail 2, the broad width inserting section 46 of the first locking piece 4a abuts against the inner circumferential wall 66a of the broad width section 66a of the second holding hole 66 of the bracket 6 and can thereby receive the upper rail 2, and hence movement of the upper rail 2 can be suppressed.

In the embodiment described above, the first holding hole 23a of the upper rail 2 is composed with an elongated shape, but the first holding hole 23a is not limited to this embodiment and can be varied appropriately.

Figure 13:
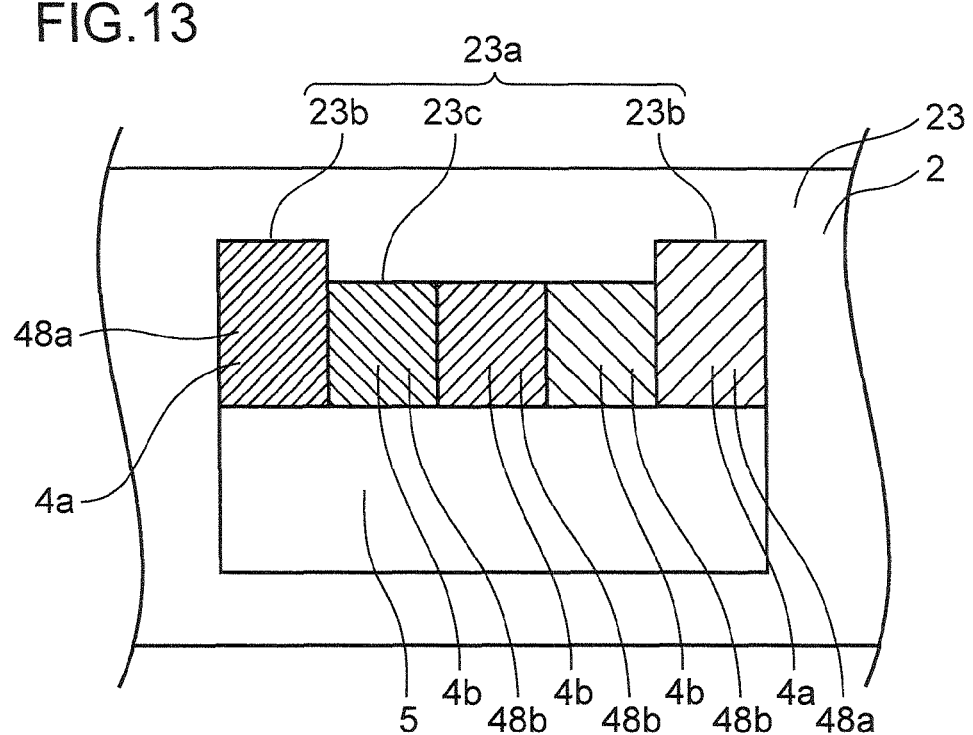
FIG. 13 is an illustrative diagram of a further embodiment of a first holding hole and a first inserting section.

For example, as shown in FIG. 13, the first inserting sections of the first locking pieces 4a are formed as broad width inserting sections 48a, and the first inserting sections of the second locking pieces 4b are formed as narrow width inserting sections 48b which have a narrower width than the broad width inserting sections 48a. Moreover, the first holding hole 23a is constituted by broad width sections 23b into which the broad width inserting sections 48a of the first locking pieces 4a are inserted, and a narrow width section 23c having substantially the same width as the narrow width inserting sections 48b, which is disposed between the broad width sections 23b.

Furthermore, in the embodiment described above, the locking pieces are constituted by five pieces, namely, two first locking pieces 4a and three second locking pieces 4b, the first locking pieces 4a being respectively arranged at either end in the lengthwise direction and the second locking pieces 4b being arranged therebetween, in such a manner that at least one of the first locking pieces 4a can always be inserted into a locking hole to assume a locked state. However, the invention is not limited to this embodiment and may be varied suitably.

Figure 14:
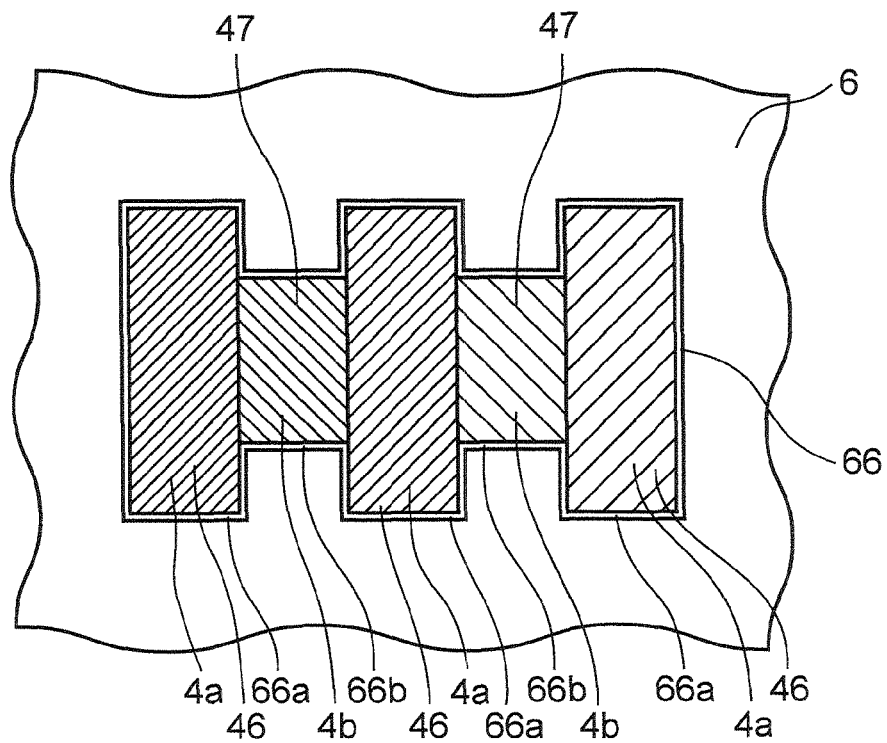
FIG. 14 is an illustrative diagram of a further embodiment of a second holding hole and a second inserting section.

For example, as shown in FIG. 14, the three first locking pieces 4a and the two second locking pieces 4b may be arranged alternately in such a manner that each of the first locking pieces 4a is adjacent to a second locking piece 4b. The broad width sections 66a of the second holding hole 66 in the bracket 6 are provided at positions corresponding to the broad width inserting sections 46 of the first locking pieces 4a and the narrow width sections 66b of the second holding hole 66 are provided at positions corresponding to the narrow width inserting positions 47 of the second locking pieces 4b.

By adopting this composition, at least one of the first locking pieces 4a is able to enter into a locking hole and become locked, at all times.

Furthermore, in the embodiment described above, there are five locking pieces, but the number of locking pieces can be varied appropriately and may be composed by any plurality of two or more locking pieces comprising at least one first locking piece 4a and at least one second locking piece 4b.

Figure 15:
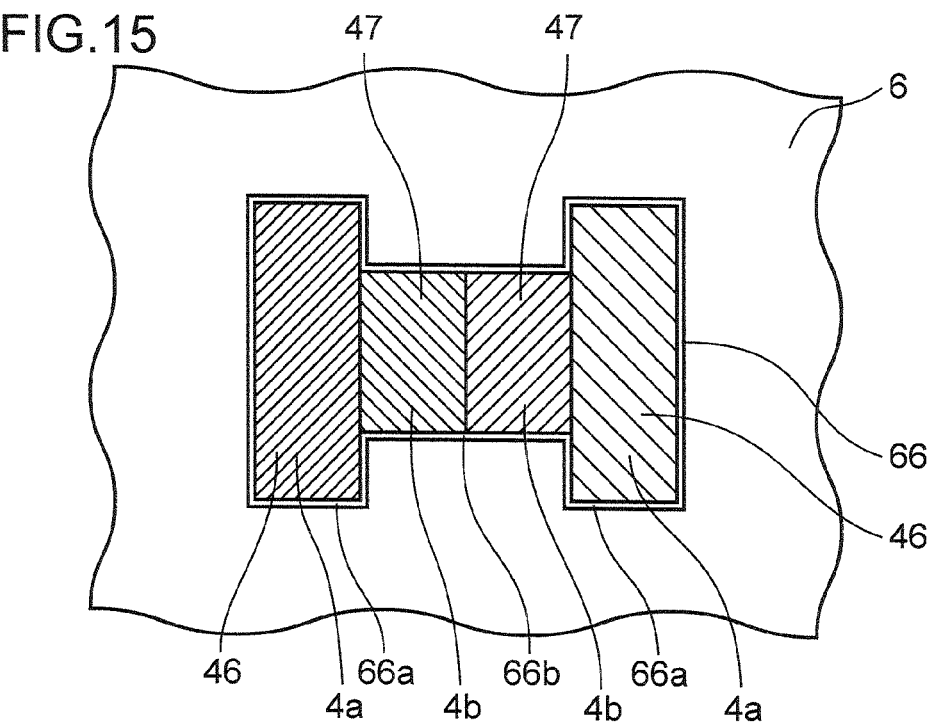
FIG. 15 is an illustrative diagram of yet a further embodiment of a second holding hole and a second inserting section.
Figure 16:
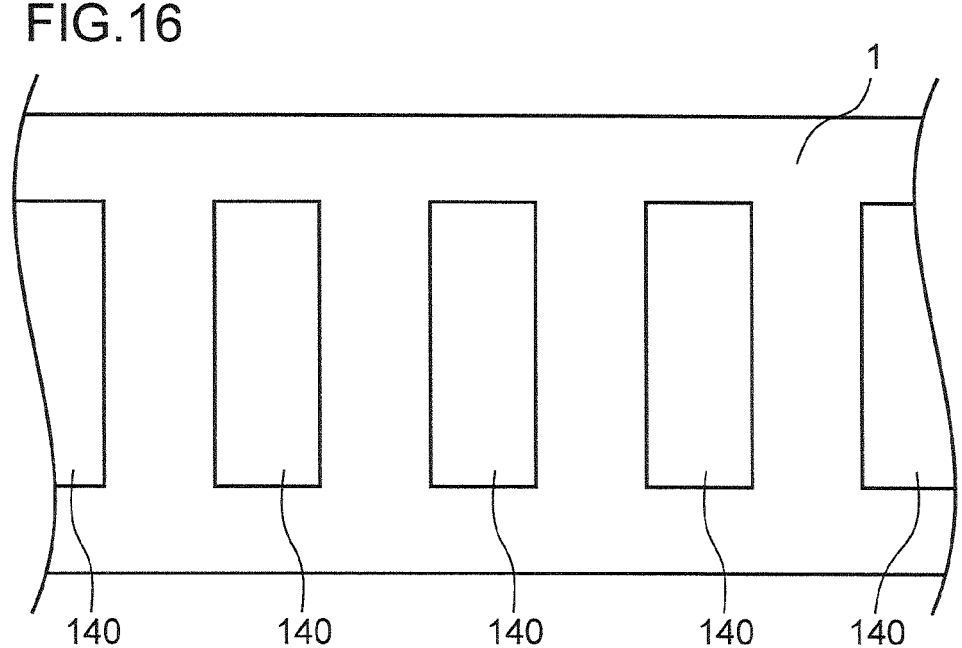
FIG. 16 is a bottom surface diagram of one portion of a lower rail provided with locking holes according to a further embodiment.

For example, the locking pieces may comprise a total of four pieces, two first locking pieces 4a and two second locking pieces 4b, as shown in FIG. 15. Moreover, in this case, the two second locking pieces 4b are arranged between the two first locking pieces 4a, and the first locking pieces 4a are each adjacent to a second locking piece 4b, in addition to which the locking holes 140 in the lower rail 1 are all formed to the same size as the respective thicknesses of the first locking pieces 4a and the second locking pieces 4b, as shown in FIG. 16.

By adopting this composition, at least one of the first locking pieces 4a is able to enter into a locking hole 140 and become locked, at all times.

Figure 17:
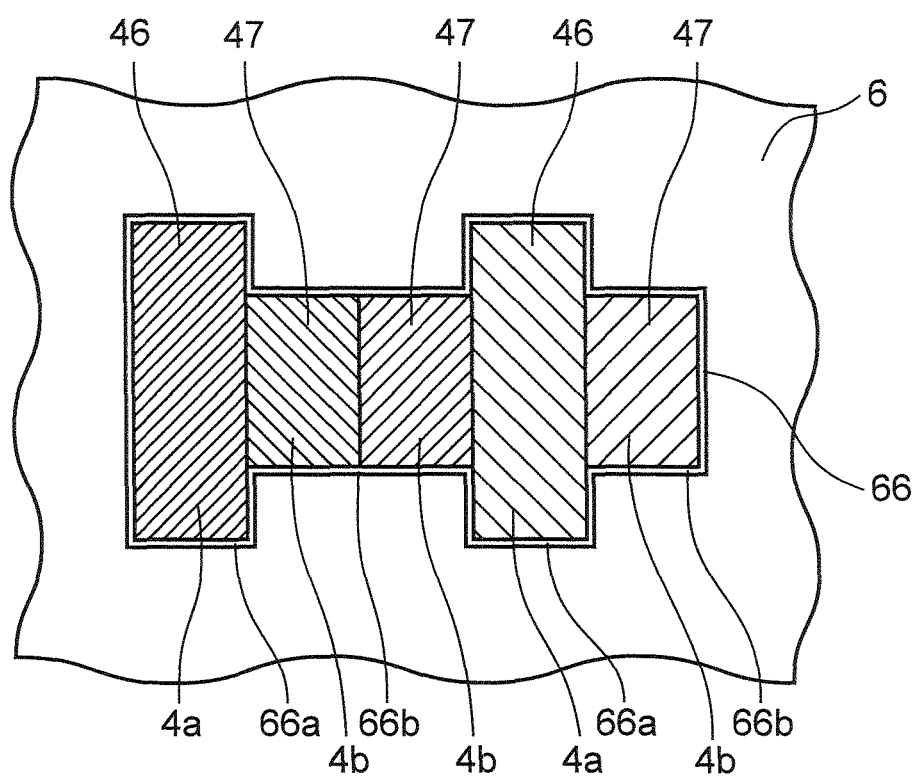
FIG. 17 is an illustrative diagram of yet a further embodiment of a second holding hole and a second inserting section.
Figure 18:
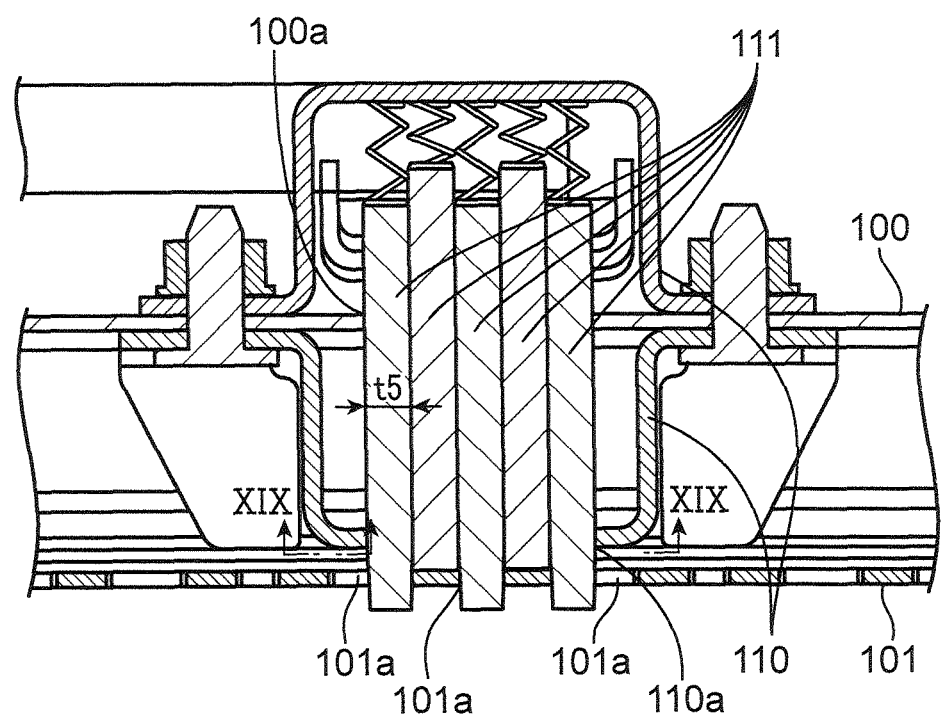
FIG. 18 is a cross-sectional diagram of the principal part of a prior art example.
Figure 19:
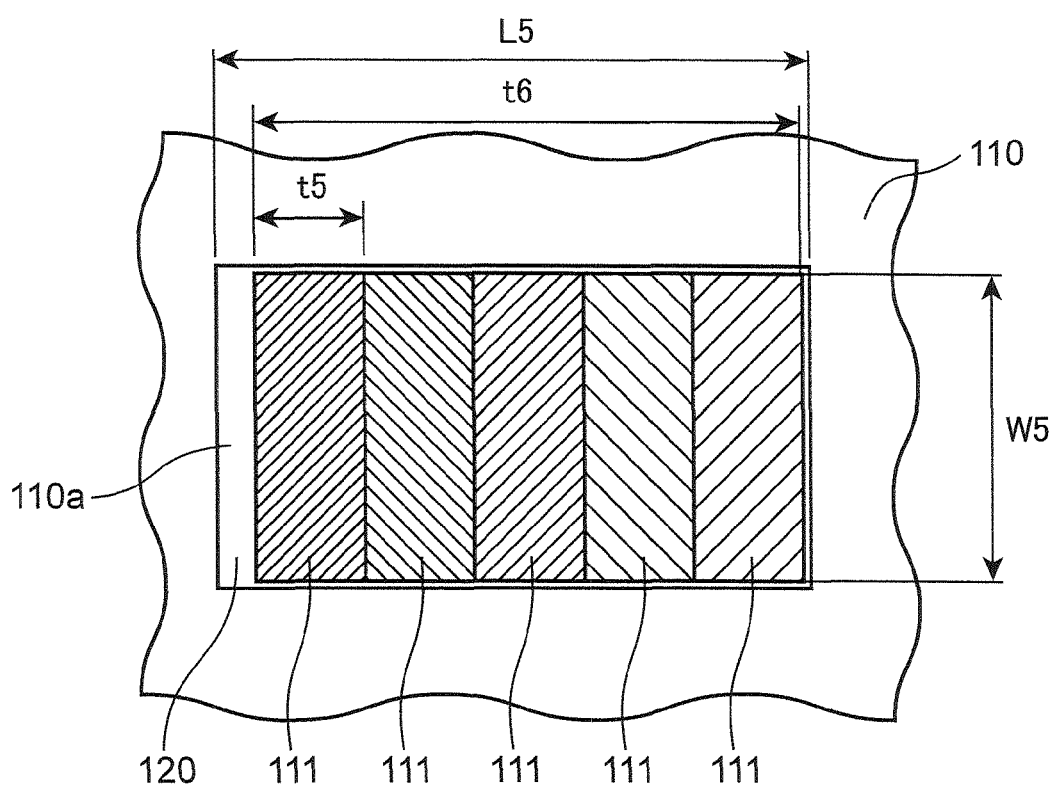
FIG. 19 is a cross-sectional diagram along XIX-XIX in FIG. 18.

Furthermore, if the locking holes 140 in the lower rail 1 are also formed to the same size as the respective thicknesses of the first locking piece 4a and the second locking piece 4b, then as shown in FIG. 17, the locking pieces may also comprise five pieces, namely, two first locking pieces 4a and three second locking pieces 4b, and two second locking pieces 4b may be arranged between two first locking pieces 4a. In this case also, at least one of the first locking pieces 4a is able to enter into a locking hole 140 and become locked, at all times.

Summary of the Embodiment

The present invention is a seat slide locking apparatus, comprising:

an elongate-shaped lower rail (1) which is fixed to a vehicle body;

an elongate-shaped upper rail (2) which is fixed to a seat;

a plurality of open engaging sections (14, 15) provided in a lengthwise direction of one of the lower rail (1) and the upper rail (2);

a holding member which is formed with a holding hole (66) and is installed on the other one of the lower rail (1) and the upper rail (2); and a plurality of locking pieces (4) which are inserted into the holding hole (66) of the holding member and can enter into and exit from the open engaging sections (14, 15), wherein the plurality of locking pieces include:

a first locking piece (4a) having a broad width inserting section (46); and a second locking piece (4b) having a narrow width inserting section (47) with a width narrower than the broad width inserting section (46), the first locking piece (4a) and the second locking piece (4b) are arranged in one row in such a manner that the respective thickness directions thereof are aligned with the lengthwise direction of the other one of the lower rail (1) and the upper rail (2), and the holding hole (66) includes a broad width section (66a) into which the broad width inserting section (46) is inserted, and a narrow width section (66b) which has a width narrower than the broad width section (66a) and into which the narrow width inserting section (47) is inserted.

According to this composition, a gap which occurs due to error between the length of the broad width section of the holding hole and the thickness of the broad width inserting section of the first locking piece is dependent on the approximate manufacturing error of the broad width section and the thickness of the broad width inserting section of one or a plurality of first locking pieces, and therefore it is possible to keep this gap to a minimum. Consequently, if a force is applied to the seat in a locked state, this force can be received by the broad width inserting section of the first locking piece abutting against the inner circumferential wall and the seating of the broad width section of the holding hole, and play between the upper rail and the lower rail can be suppressed.

In a further mode, in the seat slide locking apparatus described above, the holding holes are constituted by a first holding hole (23a) and a second holding hole (66), the holding member being installed on the other one of the lower rail (1) and the upper rail (2) in a state where the locking pieces are inserted into the second holding hole (66), the first holding hole (23a) into which locking pieces held by the holding member are inserted is provided in the other one of the lower rail (1) and the upper rail (2), the first locking piece (4a) and the second locking piece (4b) each include a first inserting section (48) which is inserted into the first holding hole (23a) and second inserting sections (46, 47) which are inserted into the second holding hole (66), the broad width inserting section (46) of the first locking piece (4a) and the narrow width inserting section (47) of the second locking piece (4b) are each constituted by at least one of the first inserting section (48) and the second inserting sections (46, 47), and the broad width section (66a) and the narrow width section (66b) are formed in at least one of the first holding hole (23a) and the second holding hole (66).

By adopting this composition, the broad width section and the narrow width section can be formed in at least one of the first holding hole and the second holding hole in which the broad width inserting section and the narrow width inserting section are formed, and the formation of the broad width section and the narrow width section and the formation of the broad width inserting section and the narrow width inserting section can be carried out easily and inexpensively.

In a further mode, in the seat slide locking apparatus described above, the plurality of locking pieces (4a, 4b) include at least two first locking pieces (4a) and at least two second locking pieces (4b), the first locking pieces (4a) and the second locking pieces (4b) are respectively constituted by pieces having the same thickness, and the first locking pieces (4a) are arranged so as to each be adjacent to the second locking piece (4b), the broad width section (66a) is arranged at a position corresponding to the broad width inserting section (46) of each of the first locking pieces (4a) and the narrow width section (66b) is arranged at a position corresponding to the narrow width inserting section (47) of each of the second locking pieces (4b), and the plurality of open engaging sections (14, 15) are each formed so that the length thereof in a direction along the lengthwise direction is the same as the respective thicknesses of the first locking pieces (4a) and the second locking pieces (4b), in such a manner that the respective locking pieces (4a, 4b) can enter into the open engaging sections (14, 15).

According to this composition, at least one of the first locking pieces can be locked in a state of being inserted into a broad width section, at all times. Consequently, if a force is applied to the seat in a locked state, this force can be received by the broad width inserting section of the first locking piece abutting against the inner circumferential wall and the seating of the broad width section of the holding hole, and play between the upper rail and the lower rail can be suppressed.

In a further mode, in the seat slide locking apparatus described above, the plurality of locking pieces (4a, 4b) include at least two first locking pieces (4a) and at least two second locking pieces (4b), the first locking pieces (4a) and the second locking pieces (4b) are respectively constituted by pieces having the same thickness, and the first locking pieces (4a) are arranged so as to each be adjacent to the second locking piece (4b), the broad width section (66a) is arranged at a position corresponding to the broad width inserting section (46) of each of the first locking pieces (4a) and the narrow width section (66b) is arranged at a position corresponding to the narrow width inserting section (47) of each of the second locking pieces (4b), the plurality of open engaging sections (14, 15) include a plurality of first open engaging sections (14) and a plurality of second open engaging sections (15), the first open engaging sections (14) are each formed so that the length thereof in a direction along the lengthwise direction is the same as the respective thicknesses of the first locking pieces (4a) and the second locking pieces (4b), in such a manner that the respective locking pieces (4a, 4b) can enter into the first open engaging sections (14), and the second open engaging sections (15) are each formed in such a manner that the length thereof in a direction along the lengthwise direction enables the first locking piece (4a) and the second locking piece (4b) to enter simultaneously into the second open engaging sections (15), and are also arranged alternately with the first open engaging sections (14) in the lengthwise direction of one of the lower rail (1) and the upper rail (2).

According to this composition, at least one of the first locking pieces can be locked in a state of being inserted into a broad width section, at all times. Consequently, if a force is applied to the seat in a locked state, this force can be received by the broad width inserting section of the first locking piece abutting against the inner circumferential wall and the seating of the broad width section of the holding hole, and play between the upper rail and the lower rail can be suppressed.

Furthermore, the one of the lower rail (1) and the upper rail (2) is the lower rail (1), the other one of the lower rail (1) and the upper rail (2) is the upper rail (2), the first holding hole (23a) is formed in the upper rail (2), the second holding hole (66) is formed in a lower part of the holding member, the first inserting section (48) is formed in an upper part of the locking piece, and the second inserting sections (46, 47) are formed in a lower part of the locking piece.

This application is based on Japanese Patent Application Serial No. 2011-118946 filed in Japan Patent Office on May 27, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A seat slide locking apparatus, comprising:
   an elongate-shaped lower rail which is fixed to a vehicle body;
   an elongate-shaped upper rail which is fixed to a seat;
   a plurality of open engaging sections provided in a lengthwise direction of one of the lower rail and the upper rail;
   a first holding hole provided in the other one of the lower rail and the upper rail from the rail that has the plurality of open engaging sections;
   a holding member which is formed with a second holding hole and is installed on the other one of the lower rail and the upper rail; and
   a plurality of locking pieces which are inserted into the first holding hole and into the second holding hole of the holding member and which can enter into and exit from the open engaging sections,
   wherein the plurality of locking pieces include:
   a first locking piece having a broad width inserting section; and
   a second locking piece having a narrow width inserting section with a width narrower than the broad width inserting section,
   the first locking piece and the second locking piece are arranged in one row in such a manner that respective thickness directions thereof are aligned with the lengthwise direction of the other one of the lower rail and the upper rail, and
   the second holding hole includes a broad width section into which the broad width inserting section is inserted, and a narrow width section which has a width narrower than the broad width section and into which the narrow width inserting section is inserted.

2. The seat slide locking apparatus according claim 1, wherein the first locking piece and the second locking piece each include a first inserting section which is inserted into the first holding hole and second inserting sections which are inserted into the second holding hole,
   the broad width inserting section of the first locking piece and the narrow width inserting section of the second locking piece are each constituted by at least one of the first inserting section and the second inserting sections, and
   the broad width section and the narrow width section are formed in at least one of the first holding hole and the second holding hole.

3. The seat slide locking apparatus according claim 1, wherein the plurality of locking pieces include at least two first locking pieces and at least two second locking pieces, the first locking pieces and the second locking pieces are respectively constituted by pieces having the same thickness, and the first locking pieces are arranged so as to each be adjacent to the second locking piece, the at least two first locking pieces being separate from each other with the second locking piece sandwiched therebetween, the broad width section is arranged at a position corresponding to the broad width inserting section of each of the first locking pieces and the narrow width section is arranged at a position corresponding to the narrow width inserting section of each of the second locking pieces, and the plurality of open engaging sections are each formed so that the length thereof in a direction along the lengthwise direction is the same as the respective thicknesses of the first locking pieces and the second locking pieces, in such a manner that the respective locking pieces can enter into the open engaging sections.

4. The seat slide locking apparatus according claim 2, wherein the plurality of locking pieces include at least two first locking pieces and at least two second locking pieces, the first locking pieces and the second locking pieces are respectively constituted by pieces having the same thickness, and the first locking pieces are arranged so as to each be adjacent to the second locking piece, the at least two first locking pieces being separate from each other with the second locking piece sandwiched therebetween, the broad width section is arranged at a position corresponding to the broad width inserting section of each of the first locking pieces and the narrow width section is arranged at a position corresponding to the narrow width inserting section of each of the second locking pieces, and the plurality of open engaging sections are each formed so that the length thereof in a direction along the lengthwise direction is the same as the respective thicknesses of the first locking pieces and the second locking pieces, in such a manner that the respective locking pieces can enter into the open engaging sections.

5. The seat slide locking apparatus according to claim 1, wherein the plurality of locking pieces include at least two first locking pieces and at least two second locking pieces, the first locking pieces and the second locking pieces are respectively constituted by pieces having the same thickness, and the first locking pieces are arranged so as to each be adjacent to the second locking piece, the at least two first locking pieces being separate from each other with the second locking piece sandwiched therebetween, the broad width section is arranged at a position corresponding to the broad width inserting section of each of the first locking pieces and the narrow width section is arranged at a position corresponding to the narrow width inserting section of each of the second locking pieces, the plurality of open engaging sections include a plurality of first open engaging sections and a plurality of second open engaging sections, the first open engaging sections are each formed so that the length thereof in a direction along the lengthwise direction is the same as the respective thicknesses of the first locking pieces and the second locking pieces, in such a manner that the respective locking pieces can enter into the first open engaging sections, and the second open engaging sections are each formed in such a manner that the length thereof in a direction along the lengthwise direction enables the first locking piece and the second locking piece to enter simultaneously into the second open engaging sections, and said second open engaging section are also arranged alternately with the first open engaging sections in the lengthwise direction of one of the lower rail and the upper rail.

6. The seat slide locking apparatus according claim 2, wherein the plurality of locking pieces include at least two first locking pieces and at least two second locking pieces, the first locking pieces and the second locking pieces are respectively constituted by pieces having the same thickness, and the first locking pieces are arranged so as to each be adjacent to the second locking piece, the at least two first locking pieces being separate from each other with the second locking piece sandwiched therebetween, the broad width section is arranged at a position corresponding to the broad width inserting section of each of the first locking pieces and the narrow width section is arranged at a position corresponding to the narrow width inserting section of each of the second locking pieces, the plurality of open engaging sections include a plurality of first open engaging sections and a plurality of second open engaging sections, the first open engaging sections are each formed so that the length thereof in a direction along the lengthwise direction is the same as the respective thicknesses of the first locking pieces and the second locking pieces, in such a manner that the respective locking pieces can enter into the first open engaging sections, and the second open engaging sections are each formed in such a manner that the length thereof in a direction along the lengthwise direction enables the first locking piece and the second locking piece to enter simultaneously into the second open engaging sections, and said second engaging sections are also arranged alternately with the first open engaging sections in the lengthwise direction of one of the lower rail and the upper rail.

7. The seat slide locking apparatus according to claim 2, wherein the one of the lower rail and the upper rail is the lower rail, the other one of the lower rail and the upper rail is the upper rail, the first holding hole is formed in the upper rail, the second holding hole is formed in a lower part of the holding member, the first inserting section is formed in an upper part of the locking piece, and the second inserting sections are formed in a lower part of the locking piece.

8. The seat slide locking apparatus according to claim 3, wherein the one of the lower rail and the upper rail is the lower rail, the other one of the lower rail and the upper rail is the upper rail, the first holding hole is formed in the upper rail, the second holding hole is formed in a lower part of the holding member, the first inserting section is formed in an upper part of the locking piece, and the second inserting sections are formed in a lower part of the locking piece.

9. The seat slide locking apparatus according to claim 4,
wherein the one of the lower rail and the upper rail is the lower rail,
the other one of the lower rail and the upper rail is the upper rail,
the first holding hole is formed in the upper rail,
the second holding hole is formed in a lower part of the holding member,
the first inserting section is formed in an upper part of the locking piece, and
the second inserting sections are formed in a lower part of the locking piece.

10. The seat slide locking apparatus according to claim 5,
wherein the one of the lower rail and the upper rail is the lower rail,
the other one of the lower rail and the upper rail is the upper rail,
the first holding hole is formed in the upper rail,
the second holding hole is formed in a lower part of the holding member,
the first inserting section is formed in an upper part of the locking piece, and
the second inserting sections are formed in a lower part of the locking piece.

11. The seat slide locking apparatus according to claim 6,
wherein the one of the lower rail and the upper rail is the lower rail,
the other one of the lower rail and the upper rail is the upper rail,
the first holding hole is formed in the upper rail,
the second holding hole is formed in a lower part of the holding member,
the first inserting section is formed in an upper part of the locking piece, and
the second inserting sections are formed in a lower part of the locking piece.

12. A seat slide locking apparatus, comprising:
an elongate first rail fixed to one of a vehicle body and a seat, a plurality of open engaging sections provided in a lengthwise direction of the first rail;
an elongate second rail fixed to the other of the vehicle body and the seat, a first holding hole provided in the second rail;
a holding member installed on the second rail and formed with a second holding hole, the second holding hole including at least one wide section that has a width transverse to the lengthwise direction and at least one narrow section that has a width transverse to the lengthwise direction, the width of the narrow section of the second holding hole being narrower than the width of the wide section thereof; and
a plurality of locking pieces inserted into both the first holding hole and the second holding hole and that can enter into and exit from the open engaging sections, the plurality of locking pieces including at least one first locking piece having a wide inserting section and a second locking piece having a narrow inserting section with a width narrower than the wide inserting section, the first locking piece and the second locking piece being arranged in one row in such a manner that respective thickness directions thereof are aligned with the lengthwise direction of the second rail.

13. The seat locking apparatus of claim 12, wherein the first rail fixed to the vehicle body.

14. The seat slide locking apparatus of claim 12, wherein the first locking piece and the second locking piece each include a first inserting section that is inserted into the first holding hole and a second inserting section that is inserted into the second holding hole, the wide inserting section of the first locking piece and the narrow inserting section of the second locking piece each defining the second inserting section.

15. The seat slide locking apparatus according to claim 12, wherein:
the plurality of locking pieces include at least two first locking pieces and at least two second locking pieces, the first locking pieces and the second locking pieces having equal thicknesses, each of the first locking pieces being adjacent to one of the second locking pieces, the first locking pieces being separated from each other with the second locking pieces sandwiched therebetween,
the at least one wide section of the second holding hole comprises two wide sections at positions corresponding to the wide inserting sections of the first locking pieces and the narrow section of the second holding hole is at a position corresponding to the narrow inserting sections of the second locking pieces, and
each of the open engaging sections has a length in a direction along the lengthwise direction that equals the thicknesses of the first locking pieces and the second locking pieces so that the respective locking pieces can enter into the open engaging sections.

16. The seat slide locking apparatus of claim 12, wherein:
the plurality of locking pieces include at least two first locking pieces and at least two second locking pieces, the first locking pieces each having a first thickness and the second locking pieces having a second thickness, each of the first locking pieces being adjacent to one of the second locking pieces, the first locking pieces being separated from each other with the second locking pieces sandwiched therebetween,
the at least one wide section of the second holding hole comprises two wide sections at positions corresponding to the wide inserting sections of the first locking pieces and the narrow section of the second holding hole is at a position corresponding to the narrow inserting sections of the second locking pieces, and
the plurality of open engaging sections include a plurality of first open engaging sections and a plurality of second open engaging sections arranged alternately with the first open engaging sections in the lengthwise direction of the first rail, each of the first open engaging sections having a length in a direction along the lengthwise direction that is the same as the respective first thicknesses of the first locking pieces so that the respective first locking pieces can enter into the first open engaging sections, and
each of the second open engaging sections having a second length in a direction along the lengthwise direction that enables one of the first locking pieces and one of the second locking pieces to enter simultaneously into one of the second open engaging sections.

* * * * *